(12) United States Patent
Kelsey

(10) Patent No.: US 6,838,020 B2
(45) Date of Patent: Jan. 4, 2005

(54) ISOTOPICALLY ENRICHED LUMINESCENT MATERIALS AND METHODS OF MAKING SAME

(75) Inventor: Paul V. Kelsey, Wilmington, DE (US)

(73) Assignee: Isonics Corporation, Golden, CO (US)

(*) Notice: Subject to any disclaimer, the term of this patent is extended or adjusted under 35 U.S.C. 154(b) by 0 days.

(21) Appl. No.: 10/298,147

(22) Filed: Nov. 15, 2002

(65) Prior Publication Data
US 2003/0094597 A1 May 22, 2003

Related U.S. Application Data

(60) Provisional application No. 60/333,812, filed on Nov. 16, 2001.

(51) Int. Cl.$^7$ .............................................. C09K 11/08
(52) U.S. Cl. .................. 252/301.6 R; 252/301.4 S; 252/301.5; 252/301.6 F; 252/301.6 S
(58) Field of Search .................... 252/301.6 F, 301.4 S, 252/301.5, 301.6 S, 301.6 R

(56) References Cited

U.S. PATENT DOCUMENTS 3,366,573 A * 1/1968 Feuer ........................ 252/646
3,382,184 A * 5/1968 Goodman .................. 252/646

* cited by examiner

Primary Examiner—C. Melissa Koslow
(74) Attorney, Agent, or Firm—Sheridan Ross P.C.

(57) ABSTRACT

The invention is directed to luminescent materials containing isotopically-enriched atomic elements and methods of making these luminescent materials. Individual embodiments of the invention include isotopically-enriched ZnO:Zn, ZnS:Cu:Cl, $Zn_2SiO_4$:Mn, $Y_2O_2S$:Eu, $Gd_2O_2S$:Tb and $CaWO_4$ phosphors as well as methods of synthesizing these luminescent materials using isotopically-enriched starting materials.

46 Claims, No Drawings

ISOTOPICALLY ENRICHED LUMINESCENT MATERIALS AND METHODS OF MAKING SAME

CROSS-REFERENCE TO RELATED APPLICATION

This application claims the benefit of priority under 35 U.S.C. § 119(e) from U.S. Provisional Application Ser. No. 60/333,812, filed Nov. 16, 2001, which is incorporated herein by reference in its entirety.

FIELD OF THE INVENTION

The invention is directed to luminescent materials having improved performance that are used in applications such as CRTs, X-ray screens, plasma displays, vacuum fluorescent displays, dosimeters and fluorescent lights.

BACKGROUND OF THE INVENTION

Luminescent materials or phosphors have been made and used commercially for many years. These inorganic, semi-conducting powders have been the backbone for most commercial display and industrial lighting applications. They can emit under various modes of excitation including: (1) high energy electrons (cathode ray tubes or CRTs), (2) low energy electrons (vacuum fluorescence), (3) high energy photons (x-ray), (4) medium energy photons (plasma), (5) low energy photons, (6) ultra-violet excitation and (7) nuclear radiation (alpha particles). The applications for each of these are prominent in various display and/or lighting industries including: (1) cathode ray tubes—television picture tubes, (2) vacuum fluorescence—digital readout assemblies, (3) x-ray—phosphor assisted intensifier screens, (4) plasma—plasma flat panel displays, (5) low energy photons—fluorescent lighting tubes, and (6) nuclear particles—radiation dosimeters. Some phosphors have applicability in more than one system. ZnS based phosphors are used in TV, x-ray, plasma displays, and vacuum fluorescent displays.

Phosphors are considered to be semiconducting materials that, by virtue of their unique band gap structures, emit photons when electrons, excited from the valence band into the conduction band, re-combine with holes in the valence band to give off photons. The wavelength of these photons is dependant upon the distance of the band gap which is a function of the chemical composition of the material, called the host. In some systems, additions to the host crystal are added to change the bandgap of the host, often forming a solid solution. For instance, CdS is often added to ZnS to shrink the bandgap, shifting the emission wavelength to lower energies or higher wavelengths. However, it can also be a function of intentionally added dopants (called activators) which form donor and/or acceptor levels within the bandgap. Activators are often cation dopants ranging in concentration from parts-per-million up to several percent. For instance, in ZnS, common activators in the parts-per-million range are copper, aluminum, and gold, whereas manganese is added in a concentration of approximately one percent. In the phosphor host yttrium oxide, europium oxide is added to approximately two mole percent.

In some cases the emission takes place from the activator itself and is characteristic of the ion, rather than the host. Some earth activators such as $Eu^{3+}$, $Tb^{3/4+}$, and $Tm^{3+}$ are line emitters that are mostly unaltered by the specific host. The dopants can either substitute in a cationic site in the various host lattices, or can be inserted interstitually into the lattice. In some instances, anionic elements such as chlorine are considered as activators, particularly in ZnS hosts.

The efficiency of the phosphor, or the intensity of emission, is a function of the recombination rate of electrons and holes after excitation. This rate is, in turn, a function of the charge carrier mobility. Therefore, any improvement in the charge carrier mobility without altering the delicate chemistry will enhance the efficiency of the phosphor. Phosphors exhibit power input limits above which the phosphor thermally breaks down or "burns." At these limits the phosphor is heated at a rate faster than it can conduct heat away, eventually altering its chemistry and degrading the local crystal structure. The brightness of the material at a given power input begins to decline, and as the process continues, color centers begin to form, quickly accelerating the degradation process. Thus, there is a need for phosphors with enhanced thermal conductivity to overcome power input limits to the phosphors thereby increasing the operating limits of display devices. Such phosphors would be resistant to thermal degradation and could stretch the normal operating envelope of the phosphors. Preferably, these phosphors with enhanced thermal conductivity could be produced without altering the synthesis processes of the conventional phosphors in various tube, display or lighting manufacturing methodologies.

SUMMARY OF THE INVENTION

The invention is directed to the incorporation of isotopically-enriched elements into phosphors to provide luminescent materials with enhanced brightness and longevity. The invention is also directed to methods of producing isotopically-enriched phosphors using isotopically-enriched starting materials.

One aspect of the invention is a ZnO:Zn phosphor comprising zinc isotopically-enriched in $^{64}Zn$. Preferably, the zinc in the phosphor is enriched to at least 60% $^{64}Zn$. A related aspect of the invention is a method of producing an isotopically-enriched ZnO:Zn phosphor by supplying ZnO with the zinc component enriched to greater than about 60% $^{64}Zn$, in a silica crucible and placing that crucible in a larger crucible containing lampblack. The crucibles are then heated and slowly cooled to produce an isotopically-enriched ZnO:Zn phosphor.

Another aspect of the present invention is a ZnS:Cu:Cl phosphor containing isotopically-enriched zinc and/or sulfur elements. Preferably, the zinc is enriched to greater than about 60% $^{64}Zn$ and the sulfur is enriched to greater than about 93% $^{32}S$. A related aspect of the invention is a method of producing an isotopically-enriched ZnS:Cu:Cl phosphor by mixing luminescent grade ZnS, having a zinc component enriched to greater than about 60% $^{64}Zn$ with $CuCl_2$ and NaCl and heating the mixture in a nitrogen atmosphere. The product is then exposed to $H_2S$ gas and slowly cooled to produce the ZnS:Cu:Cl phosphor.

Another aspect of the present invention is a $Zn_2SiO_4$:Mn phosphor comprising isotopically-enriched zinc and or isotopically-enriched silicon. Preferably, the zinc component is enriched to at least about 60% $^{64}Zn$. Additionally, the silicon is preferably enriched to at least about 94% $^{28}Si$. A related aspect of the invention, is a method of producing an isotopically-enriched $Zn_2SiO_4$:Mn phosphor by heating isotopically-enriched ZnO, $SiO_2$ and MnO, and cooling the mixture to produce the isotopically-enriched $Zn_2SiO_4$:Mn phosphor.

Another aspect of the present invention is a $Y_2O_2S$:Eu phosphor containing isotopically-enriched sulfur.

Preferably, the sulfur in the phosphor is enriched to greater than 97% $^{32}$S. A related aspect of the invention is a method of producing an isotopically-enriched $Y_2O_2S$:Eu phosphor by blending luminescent grade $Y_2O_3$, $Eu_2O_3$, sodium carbonate, and luminescent grade sulfur and firing the dried mixture. The product is then washed in water to produce the isotopically-enriched $Y_2O_2S$:Eu phosphor.

Another aspect of the present invention is a $Gd_2O_2S$:Tb phosphor containing isotopically-enriched sulfur. Preferably, the sulfur in the $Gd_2O_2S$:Tb is enriched to greater than 97% $^{32}$S. A related aspect of the invention is a method of producing an isotopically-enriched $Gd_2O_2S$:Tb phosphor by blending luminescent grade $Gd_2O_3$, $Tb_4O_7$, sodium carbonate, and luminescent grade sulfur enriched to greater than 97% $^{32}$S under acetone and firing the dried mixture. The product is washed in water to produce the $Gd_2O_2S$:Tb phosphor.

Another aspect of the invention is a $CaWO_4$ phosphor having isotopically-enriched calcium and/or tungsten. Preferably, the isotopically-enriched calcium is enriched to greater than about 98% $^{40}$Ca and the tungsten is enriched to greater than about 50% $^{186}$W. A related aspect of the present invention is a method of producing an isotopically-enriched $CaWO_4$ phosphor by mixing CaO, enriched to greater than about 98% $^{40}$Ca, with $WO_3$ and heating the mixture followed by cooling to produce the $CaWO_4$ phosphor.

DETAILED DESCRIPTION OF THE INVENTION

Isotopically enriched elements are any elemental compositions containing individual isotopes present as a percentage of the whole in greater amounts than is normally found occurring naturally. Isotopically enriched elements exhibit enhanced thermal conductivity compared to those that occur in nature. For example, natural silicon contains three isotopes, $^{28}$Si (92%), $^{29}$Si (5%) and $^{30}$Si (3%). An otherwise perfect crystal of silicon will contain imperfections in the form of isotopes of different mass with the density of these imperfections amounting to nearly 8%. This far exceeds the doping levels and density of imperfections ordinarily found in device-quality crystals.

| Impurity Type | Concentration (atoms per cm$^3$) |
| --- | --- |
| Dopant atoms | $10^{14}$ to $10^{18}$ |
| Heavy Metals | $10^{12}$ to $10^{13}$ |
| Oxygen | $5-10 \times 10^{17}$ |
| $^{29}$Si and $^{30}$Si | $4 \times 10^{21}$ |

By removing the minority isotopes, silicon-28 crystals have a more perfect crystal lattice leading to reduced phonon-phonon and phonon-electron interactions. This lattice generates less heat and electromagnetic noise, and has a higher thermal conductivity to more efficiently dissipate the heat generated.

The thermal conductivity of isotopically pure silicon-28 thin films was measured in a study conducted at Brown University (W. S. Capinski et al., Thermal Conductivity of Isotopically Enriched Silicon, Applied Physics Letters, 71(15):2109 (1997)). Thermal conductivity of the isotopically enriched silicon films was shown to be 60% greater than natural silicon at room temperature and 40% greater at 100° C. This result has been confirmed with small diameter, bulk, single crystals of silicon-28 in a study conducted by the Max Planck Institute (T. Ruf, et al., Thermal Conductivity of Isotopically Enriched Silicon, Solid State Communications, 115(5):243 (2000)). U.S. patent application Ser. No. 10/189,732 to Burden discloses the enhancement of charge carrier mobility in semiconductor devices through the use of isotopically enriched materials such as Si, Ge, and Ga (in GaAs).

Phosphors that contain a chemical element of an isotopically enriched isotope above the level that occurs in nature demonstrate the enhanced thermal conductivity and therefore display enhanced longevity and the ability to sustain increased power input over phosphors composed of naturally occurring isotopes. The enrichment imparts an enhanced charge carrier mobility that is manifested by an increase in brightness without altering the chemistry of the phosphor. The thermal conductivity is also enhanced by the enrichment that allows higher excitation power inputs, and therefore, improved brightness and lifetime. The invention includes all phosphors that contain constituent elements with multiple isotopes in the natural state. By substituting those natural elements with those of isotopically enriched elements, the overall performance of those phosphors is enhanced.

Silicon, zinc, sulfur, tungsten and other elements can be enriched by any number of commercially available methods widely known in the art including high speed centrifuge, gaseous diffusion, laser assisted magnetic separation, and various chemical extraction techniques. The selection of a specific technique is dependent upon such factors as cost, mass of the element to be separated, and throughput requirements.

One embodiment of the present invention is a ZnO:Zn phosphor containing isotopically enriched zinc for use in vacuum fluorescent displays. Naturally occurring zinc has five stable isotopes: (1) $^{64}$Zn— 48.6%, (2) $^{66}$Zn— 27.9%, (3) $^{67}$Zn— 4.1%, (4) $^{68}$Zn— 18.8%, and (5) $^{70}$Zn— 0.62%. The phosphor is produced in a clean silica crucible containing ZnO with the Zn component enriched to greater than about 60% $^{64}$Zn, preferably to greater than about 90% $^{64}$Zn, and more preferably to greater than about 99% $^{64}$Zn. The crucible is covered with a silica lid and placed in a larger crucible containing lampblack. The crucibles are placed in an electric furnace in air at about 1000° C. for about one hour, after which the furnace is turned off and allowed to cool slowly. The carbon (lampblack) reacts with the air to form carbon monoxide (CO) that reduces some of the Zn in the oxide to Zn metal that, in turn, enters the ZnO crystal in an interstitial position yielding a phosphor that luminesces a pale green color under ultra violet or CRT excitation. The use of ZnO with the Zn component enriched in $^{64}$Zn yields a ZnO:Zn phosphor with enhanced brightness and longevity over a phosphor made with ZnO comprised of naturally occurring Zinc.

Another embodiment of the invention is a ZnS:Cu:Cl phosphor composed of isotopically enriched zinc and sulfur elements. This composition is used in CRTs, X-ray screens, plasma displays, and dosimeters. Naturally occurring zinc has five stable isotopes: (1) $^{64}$Zn— 48.6%, (2) $^{66}$Zn— 27.9%, (3) $^{67}$Zn— 4.1%, (4) $^{68}$Zn— 18.8%, and (5) $^{70}$Zn— 0.62%. Sulfur has four stable isotopes: (1) $^{32}$S— 95.02%, (2) $^{33}$S— 0.75%, (3) $^{34}$S— 4.21%, and (4) $^{36}$S— 0.017%. This phosphor is produced using 100 g of luminescent grade (99.99%) ZnS, with the Zn component enriched to greater than about 60% $^{64}$Zn, preferably to greater than about 90% $^{64}$Zn, and more preferably to greater than about 99% $^{64}$Zn as a starting material. The isotopically-enriched luminescent grade ZnS is mixed with 100 ppm Cu as $CuCl_2$ and 2 weight percent NaCl. The mixture is placed in a clean silica boat and put into a tube furnace at about 1000° C. with a flowing nitrogen atmosphere. Once the boat is in place, H$_2$S gas is allowed to flow into the tube. After about one hour the H$_2$S gas is turned off, and the boat is pulled into a cool zone of the furnace. The resulting ZnS:Cu:Cl phosphor exhibits a bright green luminescence under ultra violet or CRT excitation. The use of ZnS with the Zn component enriched in $^{64}$Zn yields a phosphor with enhanced brightness compared to the same phosphor made with ZnS composed of naturally occurring zinc. A further enhancement in brightness is obtained by using a source of sulfur isotopically enriched to greater than 93% $^{32}$S, preferably greater than about 95% $^{32}$S as the sulfur component of the ZnS in the ZnS:Cu:Cl phosphor.

Another embodiment of the present invention is a Zn$_2$SiO$_4$:Mn phosphor composed of isotopically enriched zinc and silicon for use in CRT displays. Naturally occurring zinc has five stable isotopes: (1) $^{64}$Zn— 48.6%, (2) $^{66}$Zn— 27.9%, (3) $^{67}$Zn— 4.1%, (4) $^{68}$Zn— 18.8%, and (5) $^{70}$Zn— 0.62%. Silicon has three stable isotopes: $^{28}$Si— 92%, $^{29}$Si— 5% and $^{30}$Si— 3%. Oxygen also has three stable isotopes: (1) $^{16}$O— 99.975%, $^{17}$O-0.038%, and $^{18}$O— 0.204%. This Zn$_2$SiO$_4$:Mn phosphor is produced by mixing 162.76 g (2 moles) ZnO with 60.78 g (1.01 moles) of SiO$_2$ and 0.851 g (0.012 moles) of MnO in a clean platinum crucible. The crucible is covered and placed in an electric furnace at 1250° C. for one hour, removed and allowed to cool. The Zn$_2$SiO$_4$:Mn phosphor exhibits a bright green luminescence under 2537-angstrom and CRT excitation. The use of ZnO with the Zn component enriched to greater than about 60% $^{64}$Zn, preferably to greater than about 90% $^{64}$Zn, and more preferably to greater than about 99% $^{64}$Zn yields a phosphor with enhanced brightness over a phosphor made with ZnO comprised of naturally occurring zinc. A further enhancement in brightness can be obtained by incorporating a source of silicon enriched to greater than about 94% $^{28}$Si, and preferably greater than about 99% $^{28}$Si as the silicon component of the SiO$_2$ starting material to produce a Zn$_2$SiO$_4$:Mn phosphor isotopically enriched in either silicon or zinc or both silicon and zinc.

In another embodiment, isotopically enriched sulfur is used to produce a Y$_2$O$_2$S:Eu phosphor with improved brightness for use in CRT displays and lighting applications. Yttrium has only one stable isotope, $^{89}$Y, while sulfur has four: (1) $^{32}$S— 95.02%, (2) $^{33}$S— 0.75%, (3) $^{34}$S— 4.21%, and (4) $^{36}$S— 0.017%. The phosphor is produced by blending 100 g of luminescent grade Y$_2$O$_3$, 2.0 g of Eu$_2$O$_3$, and 30 g of luminescent grade sulfur enriched to greater than about 97% $^{32}$S preferably greater than about 99% $^{32}$S, and 25 g of sodium carbonate in a mortar and pestle under acetone. After drying, the mixture is placed in an alumina crucible, and fired with a cover in an electric furnace at about 1000° C. for about two hours. The crucible is then removed and allowed to cool to room temperature. After cooling, the powder is washed in hot de-ionized water to remove soluble reaction products leaving a white Y$_2$O$_2$S:Eu phosphor with a bright red emission under CRT and ultra violet excitation. The use of the isotopically-enriched sulfur yields a Y$_2$O$_2$S:Eu phosphor with superior brightness over a Y$_2$O$_2$S:Eu phosphor synthesized with naturally occurring sulfur.

In another embodiment, isotopically enriched calcium and antimony are used to produce a Ca$_{10}$(PO$_4$)$_6$FCl:Sb,Mn phosphor with improved brightness for use in fluorescent lighting. Calcium has six stable isotopes: (1) $^{40}$Ca— 96.94%, (2) $^{42}$Ca— 0.647%, (3) $^{43}$Ca— 0.135%, (4) $^{44}$Ca— 2.09%, (5) $^{46}$Ca— 0.0035%, and (6) $^{46}$Ca— 0.187%. Antimony, Sb, has two stable isotopes, $^{121}$Sb— 57.3% and $^{123}$Sb— 42.7%. Phosphorous, fluorine and manganese have only one stable isotope each, $^{31}$P, $^{19}$F, $^{55}$Mn, respectively and oxygen is dominated by $^{16}$O— 99.7%. The phosphor is produced by blending 930 g of Ca$_3$(PO$_4$)$_2$, 78.1 g CaF$_2$, 130 g (NH$_4$)$_2$HPO$_4$, 70 g Mn$_3$(PO$_4$)$_2$, and 14.57 g Sb$_2$O$_3$. The blended mixture is placed into a high purity silica boat, and fired in a controlled nitrogen atmosphere for about one hour at about 1000° C. The boat is then pulled into a cool portion of the furnace and allowed to cool to room temperature under atmosphere. The resulting phosphor exhibits a dual bright band emission peaking at 490 and 590 nm under excitation from mercury plasma lines at 253.7 and 365.0 nm (typical of fluorescent tubes). By using calcium enriched to greater than 98% $^{40}$Ca, preferably greater than about 99.5% $^{40}$Ca, the brightness is superior to a similar phosphor synthesized with naturally occurring calcium. Further brightness enhancements are seen with the use of antimony enriched to greater than about 60% $^{121}$Sb, preferably to greater than about 80% $^{121}$Sb, more preferably to greater than about 90% $^{121}$Sb, more preferably to greater than about 95% $^{121}$Sb, most preferably to greater than about 99.5% $^{121}$Sb in the formulation of this phosphor.

In another embodiment of the invention, a Gd$_2$O$_2$S:Tb phosphor containing isotopically enriched sulfur is fabricated for use in CRTs, X-ray screens, and plasma displays. Terbium has only one stable isotope, $^{159}$Tb. Gadolinium has seven stable isotopes: (1) $^{152}$Gd— 0.2%, (2) $^{154}$Gd— 2.1%, (3) $^{155}$Gd— 14.8%, (4) $^{156}$Gd— 20.6%, (5) $^{157}$Gd— 15.7%, (6) $^{158}$Gd— 24.8%, and (7) $^{160}$Gd— 21.8%. Sulfur has four stable isotopes: (1) $^{32}$S— 95.02%, (2) $^{33}$S— 0.75%, (3) $^{34}$S— 4.21%, and (4) $^{36}$S— 0.017%. The phosphor is produced by blending 100 g of luminescent grade Gd$_2$O$_3$, 1.0 g of Tb$_4$O$_7$, 30 g of luminescent grade isotopically-enriched sulfur, enriched to greater than about 97% $^{32}$S preferably greater than about 99% $^{32}$S, and 25 g of sodium carbonate with a mortar and pestle under acetone. After drying, the mixture is placed in an alumina crucible, and fired with a cover in an electric furnace at about 1000° C. for about two hours. The crucible is then removed and allowed to cool to room temperature. After cooling, the powder is washed in hot de-ionized water to remove soluble reaction products leaving a white Gd$_2$O$_2$S:Tb phosphor having a bright green emission under CRT and X-ray excitation. The use of the isotopically-enriched gadolinium and isotopically-enriched sulfur yields a phosphor with superior brightness over a similar phosphor synthesized with naturally occurring gadolinium and sulfur.

In another embodiment of the invention, a CaWO$_4$ phosphor containing isotopically-enriched calcium is produced which can be used in applications such as X-ray screens. Calcium has six stable isotopes: (1) $^{40}$Ca— 96.94%, (2) $^{42}$Ca— 0.647%, (3) $^{43}$Ca— 0.135%, (4) $^{44}$Ca— 2.09%, (5) $^{46}$Ca— 0.0035%, and (6) $^{46}$Ca— 0.187%. Tungsten has five stable isotopes: (1) $^{180}$W— 0.13%, (2) $^{182}$W— 26.3%, (3) $^{183}$W— 14.3%, (4) $^{184}$W— 30.67%, and (5) $^{186}$W— 28.6%. Although oxygen has three stable isotopes, it is dominated by $^{16}$O at 99.7%. The isotopically-enriched CaWO$_4$ phosphor is produced by mixing 56.08 g of CaO, with the calcium enriched to greater than about 98% $^{40}$Ca, preferably greater than about 99.5% $^{40}$Ca, and 232 g of WO$_3$, enriched to greater than about 50% $^{186}$W, preferably to greater than about 75% $^{186}$W, more preferably to greater than about 80% $^{186}$W, more preferably to greater than about 90% $^{186}$W, more preferably to greater than about 95% $^{186}$W, most preferably to greater than about 99% $^{186}$W. The mixture is heated in a clean silica crucible in air at about 1100° C. for about 1 hour and then removed from the furnace and allowed to cool in air. The resulting isotopically-enriched $CaWO_4$ phosphor is a self-activated phosphor that exhibits a pale violet emission under CRT, UV, and X-ray excitation. By using calcium enriched in $^{40}Ca$ and/or tungsten enriched in $^{186}W$ in the formulation of this phosphor, the brightness of the resulting phosphors are superior compared to a similar phosphor synthesized with naturally occurring calcium and tungsten isotopic mixtures.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A luminescent compound having enhanced brightness and longevity, wherein the compound comprises an isotopically-enriched atomic element.

2. A ZnO:Zn phosphor comprising zinc isotopically-enriched in $^{64}Zn$.

3. The ZnO:Zn phosphor of claim 2 wherein said isotopically-enriched zinc is enriched to greater than 60% $^{64}Zn$.

4. The ZnO:Zn phosphor of claim 2 wherein said isotopically-enriched zinc is enriched to greater than 90% $^{64}Zn$.

5. The ZnO:Zn phosphor of claim 2 wherein said isotopically-enriched zinc is enriched to greater than 96% $^{64}Zn$.

6. A method of producing a isotopically-enriched ZnO:Zn phosphor comprising:
   a. supplying ZnO with the Zn component enriched to greater than about 60% $^{64}Zn$, in a silica crucible;
   b. placing said silica crucible a larger crucible containing lampblack;
   c. heating said ZnO containing crucibles in an electric furnace to about 1000° C. for about one hour; and,
   d. slowly cooling said furnace to produce an isotopically-enriched ZnO:Zn phosphor.

7. A ZnS:Cu:Cl phosphor comprising isotopically-enriched zinc.

8. A ZnS:Cu:Cl phosphor comprising isotopically-enriched sulfur.

9. A ZnS:Cu:Cl phosphor comprising isotopically-enriched zinc and isotopically-enriched sulfur.

10. The ZnS:Cu:Cl phosphor of claim 7 wherein said isotopically-enriched zinc is enriched to greater than about 60% $^{64}Zn$.

11. The ZnS:Cu:Cl phosphor of claim 7 wherein said isotopically-enriched zinc is enriched to greater than about 90% $^{64}Zn$.

12. The ZnS:Cu:Cl phosphor of claim 7 wherein said isotopically-enriched zinc is enriched to greater than about 96% $^{64}Zn$.

13. The ZnS:Cu:Cl phosphor of claim 8 wherein said isotopically-enriched sulfur is enriched to greater than about 93% $^{32}S$.

14. The ZnS:Cu:Cl phosphor of claim 9 wherein said isotopically-enriched sulfur is enriched to greater than about 93% $^{32}S$, and wherein said isotopically-enriched zinc is enriched to greater than about 60% $^{64}Zn$.

15. The ZnS:Cu:Cl phosphor of claim 9 wherein said isotopically-enriched sulfur is enriched to greater than about 95% $^{32}S$, and wherein said isotopically-enriched zinc is enriched to greater than about 96% $^{64}Zn$.

16. A method of producing an isotopically-enriched ZnS:Cu:Cl phosphor comprising:
   a. mixing luminescent grade ZnS, with the zinc component enriched to greater than about 60% $^{64}Zn$ with 100 ppm Cu as $CuCl_2$ and 2 weight percent NaCl;
   b. heating said mixture under a flowing nitrogen atmosphere at about 1000° C.;
   c. exposing the mixture to $H_2S$ gas for about 1 hour; and,
   d. slowly cooling the mixture to recover a ZnS:Cu:Cl phosphor.

17. A $Zn_2SiO_4$:Mn phosphor comprising isotopically-enriched zinc.

18. A $Zn_2SiO_4$:Mn phosphor comprising isotopically-enriched silicon.

19. A $Zn_2SiO_4$:Mn phosphor comprising isotopically-enriched zinc and isotopically-enriched silicon.

20. The $Zn_2SiO_4$:Mn phosphor of claim 17 wherein said isotopically enriched zinc is enriched to greater than about 60% $^{64}Zn$.

21. The $Zn_2SiO_4$:Mn phosphor of claim 17 wherein said isotopically enriched zinc is enriched to greater than about 90% $^{64}Zn$.

22. The $Zn_2SiO_4$:Mn phosphor of claim 17 wherein said isotopically enriched zinc is enriched to greater than about 96% $^{64}Zn$.

23. The $Zn_2SiO_4$:Mn phosphor of claim 18 wherein said isotopically enriched silicon is enriched to greater than about 94% $^{28}Si$.

24. The $Zn_2SiO_4$:Mn phosphor of claim 18 wherein said isotopically enriched silicon is enriched to greater than about 99% $^{28}Si$.

25. The $Zn_2SiO_4$:Mn phosphor of claim 18 wherein said isotopically enriched silicon is enriched to greater than about 94% $^{28}Si$, and wherein said isotopically enriched zinc is enriched to greater than about 60% $^{64}Zn$.

26. The $Zn_2SiO_4$:Mn phosphor of claim 19 wherein said isotopically enriched silicon is enriched to greater than about 99% $^{28}Si$, and wherein said isotopically enriched zinc is enriched to greater than about 96% $^{64}Zn$.

27. A method of producing an isotopically-enriched $Zn_2SiO_4$:Mn phosphor comprising:
   a. heating ZnO, $SiO_2$ and MnO at a ratio of 2 moles: 1.01 moles: 0.012 moles, wherein the zinc in said ZnO is enriched to greater than about 60% $^{64}Zn$, to about 1250° C. for about one hour; and,
   b. cooling said mixture to produce an isotopically-enriched $Zn_2SiO_4$:Mn phosphor.

28. The method of claim 27 wherein the Si in said $SiO_2$ is enriched to greater than 94% $^{28}Si$.

29. An $Y_2O_2S$:Eu phosphor comprising isotopically-enriched sulfur.

30. The $Y_2O_2S$:Eu phosphor of claim 29 wherein said isotopically enriched sulfur is enriched to greater than 97% $^{32}S$.

31. A method of producing an isotopically-enriched $Y_2O_2S$:Eu phosphor comprising:

a. blending luminescent grade $Y_2O_3$, $Eu_2O_3$, sodium carbonate, and luminescent grade sulfur enriched to greater than about 97% $^{32}S$ under acetone;

b. firing the dried mixture at about 1000° C. for about two hours; and, c. washing the resulting powder in hot de-ionized water to produce an isotopically-enriched $Y_2O_2S$:Eu phosphor.

32. A $Gd_2O_2S$:Tb phosphor comprising isotopically-enriched sulfur.

33. The $Gd_2O_2S$:Tb phosphor of claim 32 wherein said isotopically enriched sulfur is enriched to greater than 97% $^{32}S$.

34. A method of producing a $Gd_2O_2S$:Tb phosphor comprising:

a. blending luminescent grade $Gd_2O_3$, $Tb_4O_7$, sodium carbonate, and luminescent grade sulfur enriched to greater than 97% $^{32}S$ under acetone;

b. firing the dried mixture at about 1000° C. for about two hours; and, c. washing the resulting powder in hot de-ionized water to produce a $Gd_2O_2S$:Tb phosphor.

35. A $CaWO_4$ compound comprising isotopically-enriched calcium wherein the compound is a phosphor.

36. A $CaWO_4$ phosphor comprising isotopically-enriched tungsten.

37. A $CaWO_4$ phosphor comprising isotopically-enriched calcium and isotopically-enriched tungsten.

38. The $CaWO_4$ phosphor of claim 35 wherein said isotopically-enriched calcium is enriched to greater than about 98% $^{40}Ca$.

39. The $CaWO_4$ phosphor of claim 36 wherein said isotopically-enriched tungsten is enriched to greater than about 50% $^{186}W$.

40. The $CaWO_4$ phosphor of claim 36 wherein said isotopically-enriched tungsten is enriched to greater than about 80% $^{186}W$.

41. The $CaWO_4$ phosphor of claim 36 wherein said isotopically-enriched tungsten is enriched to greater than about 90% $^{186}W$.

42. The $CaWO_4$ phosphor of claim 36 wherein said isotopically-enriched tungsten is enriched to greater than about 95% $^{186}W$.

43. The $CaWO_4$ phosphor of claim 36 wherein said isotopically-enriched tungsten is enriched to greater than about 99% $^{186}W$.

44. The $CaWO_4$ phosphor of claim 37 wherein said isotopically-enriched tungsten is enriched to greater than about 90% $^{186}W$, and wherein said enriched calcium is enriched to greater than about 98% $^{40}Ca$.

45. A method of producing an isotopically-enriched $CaWO_4$ phosphor comprising:

a. mixing CaO, enriched to greater than about 98% $^{40}Ca$, with $WO_3$;

b. heating the mixture to about 1100° C. for about one hour; and, c. cooling the mixture to produce a $CaWO_4$ phosphor.

46. The method of claim 45, wherein said $WO_3$ is enriched to greater than about 50% $^{186}W$.

* * * * *